3,183,098
DRY MIX FOR FROZEN DESSERTS
Fredric J. Baur, Cincinnati, Ohio, assignor to The Procter & Gamble Company, Cincinnati, Ohio, a corporation of Ohio
No Drawing. Filed Dec. 28, 1962, Ser. No. 247,844
2 Claims. (Cl. 99—136)

This invention relates to a process of making frozen desserts and the products made by that process. In particular, it relates to a process of making a frozen dessert substantially free of fatty emulsifiers in which the ingredients, in the form of a dry mix, are admixed with water or milk, and the mixture is placed in a freezer unit and frozen without agitation. This process yields a tasteful product of smooth consistency, good getaway, and high overrun. As used herein the term "getaway" refers to ease of melting in the mouth, and the term "overrun" is defined as the percent increase in volume of the wet mix upon freezing in excess of the volume of the wet mix.

There are many difficulties inherent in the preparation of frozen desserts which are made by admixing the components and placing the mixture in a freezer unit of a refrigerator and freezing without agitation. Generally, such frozen desserts do not compare in consistency, flavor and overall appearance to conventional ice cream made by the normal industrial process which involves constant agitation during the freezing process.

Ordinarily, agitation in frozen desserts tend to cause large ice crystals to form. Also, the fat phase will tend to separate from the other components of the mix and cause large air cells to form which are improperly distributed. Such results will affect the body, texture and appearance of the frozen dessert, and generally determine whether the product is acceptable or not.

In the prior art several ways have been suggested to overcome such defects of conventional frozen desserts. It has been suggested, for instance, that two or three times during the course of freezing, the dessert should be removed from the freezing unit and agitated in order to minimize the growth of ice crystals and improve the distribution of air cells. It can be recognized that, at the least, this is an inconvenient method of making the frozen dessert as it requires frequent attention by the maker; moreover, the product quality is not improved markedly by this process and still does not approach the quality of commercial ice cream. Another method which has been suggested in order to get air uniformly distributed throughout the mix is to whip natural cream and fold it into the mix shortly before freezing. This process involves two or more steps in that the ingredients must be mixed together, the cream whipped and then folded into the mixture before freezing. It has also been suggested that in order to prevent ice crystal growth a very high concentration of butter fat in combination with a stabilizer agent could be used. However, the high percentage of butter fat makes the cost of the product high and therefore it is uneconomical to produce.

Another method to improve the quality, texture, and the body of frozen desserts which has been suggested is to incorporate a stabilizer such as sodium alginate into the mix. As taught by the prior art, however, even the incorporation of a stabilizer into the mix does not eliminate the necessity of periodic stirring or agitation during freezing; thus, several steps are required to make the product.

Frozen desserts made by the processes and with the compositions now known have insufficient air incorporated into them and are grainy. As a result there is too little overrun and the product is heavy and soggy and compares unfavorably with commercially produced ice cream.

It is one of the objects of the present invention to provide a process of preparing a frozen dessert which requires only one mixing step, and that step is prior to placing the mixture into the freezer unit after which it requires no subsequent agitation.

It is a further object of this invention to provide a dry frozen dessert mix which requires only the one step of mixing water and/or milk into the mix before it is placed in the freezing unit.

It is a still further object of this invention to provide a frozen dessert which has good flavor, body and texture characteristics and a process for making it. Other objects of this invention will be apparent from the description and claims herein.

In general, the frozen dessert composition of this invention comprises, on a dry mix basis, from about 12% to about 32% fat, from about 25% to about 45% non-fat milk solids, from about 25% to about 50% sweetening agent, and from about 0.2% to about 1.5% of a stabilizer selected from the group consisting of alginates and derivatives thereof, Irish moss, guar gum, locust bean gum, cellulose gums and water-soluble salts thereof, and combinations of the above stabilizers, and it must be substantially free of oil-soluble emulsifiers such as mono- and di-glycerides and polyoxyethylene sorbitan fatty acid esters such as are known in the trade as Tween 80 and Tween 65.

As can be recognized by those skilled in the art, each ingredient of the composition affects and contributes to the overall quality of the frozen dessert only in relation to the other components. Each has its separate function yet, when they are all added together in the proper proportion, a superior product is obtained which could not be obtained by the random admixing of the individual ingredients or predicted from the known properties of each taken alone.

Fat, an important constituent of the frozen dessert described herein, is added to the mixture in order to produce the full, rich, creamy flavor which is characteristic of good commercial ice cream. The fat can be incorporated into the composition of the invention at levels ranging, by weight on a dry basis, from about 12% to about 32%. The preferred level is about 20–26%. The use of too little fat results in a product having poor body and consistency whereas the use of too much fat results in a product tending toward phase separation. The fat contributes to the body and melting resistance of the frozen dessert and produces a smoothness of texture and consistency that is difficult to obtain by any other means.

The fat which is used in the compositions described herein can be any which melts easily in the mouth so as not to give a waxy taste to the frozen dessert when it is eaten and also which has, relatively, a substantial solids constant at the product preparation and use temperatures so as to impart smoothness and consistency to the frozen dessert. If fats are used which have too high a melting temperature and poor melting behavior in the mouth, i.e., do not easily melt, a frozen dessert made with them will have a waxy, undesirable organoleptic sensation when it is eaten, or gateway is poor. If the fat has too low a melting temperature the product will lack a desirable consistency; therefore, it is essential that the fat contain a substantial amount of solids at the product preparation and use temperatures. Thus the fat used will usually melt in the range of about 90° to about 103° F. (Wiley).

It has been found that the types of fats used to prepare margarines are especially suitable for use in the compositions of this invention. In general, these fats are derived from one or more vegetable oils. Suitable vegetable oils can include cottonseed oil, soybean oil, corn oil, sunflower oil, peanut oil, olive oil, rice oil, safflower oil, palm oil and coconut oil. It may be necessary to hydrogenate some of the above oils to provide proper melting behavior and keeping quality. The fat may consist of two or more ingredients rather than a single component.

Other fats including those of animal origin such as lard and tallow, and marine fats and oils such as are obtained from whale oil, sardine oil, herring oil, and menhaden oil, can be used, provided they have melting points and keeping quality which would give them the desirable properties hereinbefore indicated.

An especially preferred fat mixture to use in the process and compositions of this invention consists of a mixture of ⅓ partially hydrogenated vegetable oil (63:35 ratio of soybean:cottonseed oil), having an I.V. of about 75, and ⅔ coconut oil.

The non-fat milk solids which are used in the compositions of this invention are the solids of skim milk and include proteins, mineral matter, and milk sugar. The sugars present add to the sweet taste of the frozen dessert and the proteins aid overrun, help to make the frozen dessert smoother, and also aid in preventing weak body and coarse texture. In the compositions of this invention, the non-fat milk solids can be used at levels ranging from about 25% to about 45%, on a dry basis, with the preferred level being about 32–36%. If too high a percent of non-fat milk solids is used, the composition takes on a "sandy" texture. The primary cause of sandiness is too high a lactose content in relation to the amount of water present to hold it in solution. The non-fat milk solids increase the effect on the whipping ability of the frozen dessert and they also increase the viscosity and resistance to melting of the composition. At the same time they tend to lower the freezing point of the mix. The preferred non-fat milk solids for use in this invention are those of the "instant" type. "Instant" refers to the fact that the powders disperse easily and quickly in water or milk without forming lumps. These can be produced by spray drying the solids in a dehydration chamber.

The preferred sweetening agent for use in the compositions of this invention is sugar. It is added to the composition not only for its sweetening effect, but also for its ability to enhance the creamy flavor or texture of the composition. Lack of sweetness produces a flat taste in the composition, while too much sugar masks the other desirable flavors. The preferred sugar for use in the composition of this invention is sucrose; however, sucrose can be mixed with or replaced by sugars such as dextrose, fructose and dry corn syrup solids to good advantage. Other sweetening agents which can be used in combination with sugar include sorbitol and glycerol. The sweetening agent can be incorporated into the dry mix at levels ranging from 25% to 50% by weight on a dry basis, and it is preferred to use about 38–44%.

The stabilizers used in the composition of this invention are incorporated in it for the purpose of preventing the formation of the objectionable large ice crystals which detract from the body and texture of the frozen dessert. Stabilizers are effective in creating a smooth texture and giving body to the composition. The amount of stabilizer to use varies with its properties, the solids content of the mix, and other factors; however, in the compositions of this invention it has been found that the stabilizers can be used at levels ranging from 0.2% to about 1.5% by weight on a dry basis with good results. The preferred usage is about 0.3–0.7%. The incorporation of too much stabilizer in the mix results in excess body, poor getaway, and gumminess of the resulting product. Not all stabilizers are suitable for use in the composition described herein. Those stabilizers which are suitable and which aid in obtaining a stable, smooth textured product and increase the whipping ability of the mix, thereby allowing the attainment of high overrun, include water-soluble alginate salts such as sodium and potassium alginate, and also derivatives thereof, such as propylene glycol and ethylene glycol esters of alginic acid, the former ester of which is sold under the trademark "Kelocoloid HV"; Irish moss; locust bean gum, guar gum; and cellulose gums such as carboxymethyl cellulose and methyl cellulose and water-soluble salts thereof such as sodium and potassium carboxymethyl cellulose. Sodium alginate and the propylene glycol ester of alginic acid are preferred stabilizers.

It has been disclosed in the prior art that emulsifiers should be added to conventional commercial ice cream in order to improve the whipping quality of the mix, and to aid in obtaining an ice cream having smoother body and texture. Suitable emulsifiers which have been suggested are mono- and diglycerides obtained from the glycerolysis of edible fats and oils. It would be reasonable to assume that the presence of emulsifiers, particularly the oil-soluble type such as the mono- and diglycerides would impart the same properties to a frozen dessert such as described herein. It has been found, to the contrary, that the addition of oil-soluble emulsifiers to the composition interferes with the foam stability of the mix, and that compositions containing the oil-soluble emulsifiers are less smooth and have less overrun than those compositions containing only the alginate stabilizer or other stabilizers. Water-soluble emulsifiers have a less deleterious effect on the composition; however, they nevertheless are not desired since they tend to form water-in-oil emulsions rather than the desired oil-in-water emulsion.

The process used in the making of the frozen dessert of this invention is simple and requires only one mixing operation, that being when the dry ingredients are mixed with water or milk prior to the placing of the composition in the freezer unit for freezing. No mixing is required at all once the freezing process has started. This is in contrast to other commercially available frozen dessert mixes which require at least two mixing steps, one prior to placing the composition into the freezer, and one or more during the freezing process in order to prevent the formation of large ice crystals and to incorporate air into the composition to obtain sufficient overrun.

It is contemplated that the dry ingredients of the compositions of this invention would be premixed, i.e., the individual ingredients would be premixed in the proper proportions by mechanical means, after which the only remaining step prior to placing the composition in the freezer would be to add water or milk and whip. This premixing can be accomplished by milling the ingredients, ribbon blending, or by other means known in the art. The premixed ingredients can be packaged as a prepared mix.

Assuming that the ingredients other than milk or water are available in a premixed dry powder form, the powder is placed in a container, then flavoring and the liquid ingredient, such as water, skim milk or whole milk, is added, generally at a temperature of about 120–180° F., and the mixture is then beaten until the various ingredients are in intimate contact. The flavor can also be present in the dry mix. The expression "intimate contact" as used herein is intended to mean that the components are so mixed as to give the appearance of homogeneity. It is desirable that the composition on a wet basis contain about 45–65% by weight of water or milk. If too little water or milk is used, the product tends to become too thick and if too large an amount of water or milk is used the product is too thin and loses its consistency. The amount of water or milk to be added, however, depends on one's individual preferences. The preferred range is from about 55–62% by weight. When water is used as the liquid ingredient of the composition a good product is obtained; however, an even better product having greater smoothness and consistency can be obtained if whole milk is substituted for the water portion. The use of skim milk as the liquid ingredient results in a product which is not appreciably improved over the one obtained using water.

Mixing of the liquid ingredient in the home is by means of an ordinary household electric beater; however, any other means is acceptable. Although the whipping time necessary to obtain substantial admixture of the liquid with the dry ingredients, and sufficient air in the mixture to obtain a stable foam, varies, the optimum time is about 8–15 minutes; satisfactory results can be obtained, however, if the mixture is beaten for greater or lesser amounts of time. If the composition is insufficiently beaten, hydration of the protein and stabilizers is incomplete and a stable foam is not produced. Excessive whipping time is not generally harmful, providing the beater speed is not too high, as overrun is generally increased by increased whipping time; however, if excessive beater speed is used and the product is beaten for too long a period, the overrun will be less and the products might separate on freezing. It is desirable to have at least about 100% overrun after freezing in the compositions of this invention. Thus the whipping or beating time can range from about 5 to about 30 minutes or more and should be sufficient to aerate the mix to produce a stable foam and insure hydration of the protein and stabilizers, but not sufficient to reduce overrun and cause separation of the components of the composition on freezing.

It is not essential to the practice of this invention that the liquid portion with which the dry ingredients are admixed and beaten be at any particular temperature before mixing, although the optimum results, generally, are achieved when the liquid is at a temperature of from about 120–180° F. Good products can be achieved using liquids at lower temperatures. For example, a product having good characteristics was obtained using water at 80° F. and a 1:1 mixture of Irish moss and sodium carboxymethyl cellulose as the stabilizer in the composition.

Frozen desserts of excellent quality and consistency with high overrun can also be obtained when the liquid ingredient is admixed at room temperature (70–80° F.) and a leavening system is incorporated into the dry ingredients. The leavening system releases gas into the mixture when water or milk is added and in that manner compensates for that gas which is not ordinarily obtained due to the lower temperature of this liquid ingredient, i.e., when the liquid ingredient is added at the lower temperature less gas is incorporated into the system during the whipping process than if the liquid ingredient were added at a higher temperature. The selection of a suitable chemical leavening system for use in the compositions of this invention will pose no problem for one skilled in the formulation of culinary mixes. In general, such systems are composed of a baking soda, e.g., sodium, potassium, or ammonium bicarbonate, on the one hand, and one or more acid phosphate or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others.

In general, the amount of baking acid in the product should range from about .5 to 4.5% by weight with an equivalent amount by weight of baking soda also added (about 1% to about 9% for the total leavening system). The preferred level of baking acid is from 1–3%. If an equivalent amount of baking soda is also added, the leavening system (acid plus soda) is preferably present in an amount ranging from 2–6% by weight of the product. Frequently, provision of a slight excess of soda is advantageous so as to assure absence of an unreacted phosphate acid and/or to compensate for any acid tendencies of mix ingredients.

After the desired mixing and aeration is accomplished, the composition is poured into a proper container and placed in the freezing unit of the refrigerator and subjected to freezing temperatures until frozen. About 1 to 3 hours will usually suffice depending on how cold the freezing unit is: the colder the freezing unit, the shorter time will be needed for freezing. After a suitable period of time the product is removed from the refrigerator.

This invention will be more fully understood from the following examples, but they are not to be considered as limiting thereof. Parts and percentages are by weight unless otherwise specified.

Example I

To ½ lb. of a dry mix consisting of 24.8 parts fat (⅓ partially hydrogenated vegetable oil [35:65 ratio of cottonseed and soybean oil, I.V. of about 75], and ⅔ coconut oil), 40.4 parts sucrose, 34.3 parts non-fat milk solids, and 0.5 part sodium alginate was added 330 cc. of water heated to 150° F. and one teaspoonful of vanilla. The mix was beaten at medium speed with a household type mixer for a total of approximately 8 minutes and then it was poured into a refrigerator tray and allowed to freeze solid (freezing time about 2 hours and the average temperature of the freezing compartment was 14° F.). The resulting frozen dessert had a smooth consistency, was devoid of large ice crystals, had 150% overrun, did not separate on freezing, and was tasty.

The fat in the above example can be replaced, in part or in whole, by partially hydrogenated corn oil, cottonseed oil, peanut oil, or safflower oil and mixtures thereof with comparable results.

Example II

Another composition was prepared which consisted of 37.6 parts coconut oil, 18.8 parts partially hydrogenated vegetable oil (35:65 ratio of cottonseed and soybean oil, I.V. of about 75), 78.2 parts non-fat milk solids, 92 parts sucrose, and 1.2 parts sodium carboxymethyl cellulose. To ½ lb. of this dry mix was added 330 cc. of milk heated to 150° F. The milk was added slowly while the mix was beaten with a household type mixer. The mix was beaten at medium speed for about 8 minutes, poured into a refrigerator tray, and frozen solid (about 3 hr. freezing time). The resulting product had good consistency, was smooth and tasty, contained no perceptible ice crystals and the overrun was approximately 100%.

Example III

In this example, the dry mix consisted of 37.6 parts coconut oil, 18.8 parts partially hydrogenated vegetable oil (35:65 ratio of cottonseed and soybean oil, I.V. of about 75), 92.0 parts sucrose, 78.2 parts non-fat milk solids, 1.2 parts sodium alginate, 5.0 parts monocalcium phosphate and 4.0 parts soda. To ½ lb. of this was added 330 cc. of water heated to 80° F. The water was added slowly while beating. After beating for about 10 minutes the wet mix was placed in the freezer compartment of a refrigerator and frozen (about 2 hours freezing time). The quality of the product was approximately the same as was obtained in Example I using water at 150° F. and no leavening system.

Example IV

Another composition was prepared using the dry mix of Example I. To ½ lb. of this mix was added 380 cc. of whole milk heated to a temperature of 180° F. The mixture was beaten for 10 minutes at medium speed and then it was frozen. The product was very smooth, had good consistency and the overrun was 100%.

Example V

In this example a dry mix was prepared which had the composition of 37.6 parts coconut oil, 18.8 parts partially hydrogenated vegetable oil (35:65 ratio of cottonseed and soybean oil, I.V. of about 75), 92 parts sucrose, 78.2 parts non-fat milk solids, and 2.4 parts "Caralak" (Irish moss plus locust bean gum). To ½ lb. of this dry mix was added 330 cc. of water at a temperature of 150° F. The mixture was beaten for 18 minutes at medium speed and then placed in the freezing unit for freezing. The product made according to this process had an excellent taste, did not separate on freezing and was not grainy. The overrun was 100%. In overall appearance and texture it compared favorably with commercial ice cream.

*Example VI*

To ½ lb. of a dry mix consisting of 56.4 parts fat (⅓ partially hydrogenated vegetable oil [35:65 ratio of cotton seed and soybean oil, I.V. of about 75] and ⅔ coconut oil), 92 parts sucrose, 7.82 parts non-fat milk solids, 4 parts soda, 5 parts monocalcium phosphate and 1.2 parts sodium alginate was added 330 cc. of water heated to 80° F., and one teaspoonful of vanilla. The fluids were added slowly while beating the mixture continuously with a household mixer. The mix was beaten at medium speed for approximately 15 minutes and then it was poured into a metal container and allowed to freeze for 1½ hours. The product had a smooth consistency, was not grainy, and was tasty.

*Example VII*

A dry mix was prepared which contained 37.6 parts coconut oil, 18.8 parts partially hydrogenated vegetable oil (35:65 ratio of cottonseed and soybean oil, I.V. of about 75), 78.2 parts non-fat milk solids (Carnation instant spray dried), 92.0 parts sucrose, and 1.2 parts propylene glycol ester of sodium alginate. To 228 g. of this was added 228 cc. of water at 150° F. and a teaspoonful of vanilla flavoring. The mixture was beaten at medium speed, for about 30 minutes, and placed in the freezer compartment of a refrigerator and frozen for about 2 hours. The product was tasty, smooth, was devoid of perceptible ice crystals, had good consistency and had approximately 105% overrun. In taste and texture it compared favorably with commercial ice cream.

In the above example, the alginate ester stabilizer can be replaced with, for example, Irish moss, or sodium carboxymethyl cellulose, and comparable results will be obtained thereby. Similarly, the sucrose can be replaced, all or partially, by dextrose, fructose or dry corn syrup solids without materially affecting the flavor of the product.

*Example VIII*

A dry mix is prepared which contains 57 parts fat (a 90:10 mixture of partially hydrogenated soybean and cottonseed oil, I.V. of about 75), 78.6 parts non-fat milk solids, 86 parts of a 1:1 ratio of sucrose and dextrose, and 1.0 part sodium alginate. To ½ lb. of this dry mix is added 340 cc. of water at a temperature of 160° F. The mixture is beaten for 15 minutes at medium speed and then poured into a container and frozen for 2 hours. The product is tasty, has exceptional getaway, and has a smooth consistency.

The sodium alginate stabilizer used in this example can be replaced by Irish moss, cellulose gums, locust bean gum, or guar gum with comparable results. Similarly, the sweetener can be replaced by 100% sucrose or dextrose, or mixtures of either of these with dry corn syrup solids or fructose with no decrease in quality.

*Example IX*

A dry mix consisting of 37 parts coconut oil, 20 parts of a 35:65 ratio mixture of partially hydrogenated cottonseed and soybean oil, I.V. of about 75, 90 parts sucrose, 76 parts non-fat milk solids, 1.3 parts sodium carboxymethyl cellulose, 4.5 parts dicalcium phosphate, and 4.5 parts soda is prepared. To this is added 335 cc. of water heated to 80° F. The water is added slowly while beating. After the mix is beaten for about 10 minutes it is then placed in a freezer and frozen (about 2.5 hours freezing time).

The product is smooth, tasty, and has good getaway. In texture and overall appearance the quality is the same as is obtained using water at 155° F. and no leavening system.

The dicalicum phosphate disclosed herein can be replaced, all or partially, by monocalcium phosphate, sodium acid pyrophosphate, potassium acid tartrate, monosodium phosphate, or sodium aluminumphosphate, for example, with comparable results.

What is claimed is:

1. A dry mix suitable for the convenient preparation of a frozen dessert, which is an oil-in-water emulsion, by mixing and whipping steps at ordinary room temperature prior to freezing and without agitation during freezing, said mix consisting essentially of from about 20% to about 26% fat having a Wiley melting point of about 90° F. to about 103° F., from about 38% to about 44% sweetening agent, from about 32% to about 36% non-fat milk solids, from about 2% to about 6% of a chemical leavening system, and from about 0.3% to about 0.7% of a stabilizer selected from the group consisting of alginates and derivatives thereof, Irish moss, guar gum, locust bean gum, cellulose gums and water-soluble salts thereof, and mixtures thereof, said mix being substantially free of oil-soluble emulsifiers.

2. The process of making a frozen dessert which is an oil-in-water emulsion comprising (A) mixing (1) a dry mix consisting essentially of from about 20% to about 26% fat having a Wiley melting point of about 90° F. to about 103° F., from about 38% to about 44% sweetening agent, from about 32% to about 36% non-fat milk solids, from about 2% to about 6% of a chemical leavening system, and from about 0.3% to about 0.7% of a stabilizer selected from the group consisting of alginates and derivatives thereof, Irish moss, guar gum, locust bean gum, cellulose gums and water-soluble salts thereof, and mixtures thereof, said mix being substantially free of oil-soluble emulsifiers, with (2) a liquid selected from the group consisting of water and milk, (B) whipping for about 8 to about 15 minutes until the various ingredients are substantially in intimate contact and then (C) freezing without further agitation.

References Cited by the Examiner

UNITED STATES PATENTS

| | | | |
|---|---|---|---|
| 462,206 | 10/91 | Clotworthy | 99—95 |
| 468,631 | 2/92 | Allen | 99—136 |
| 2,485,935 | 10/49 | Steiner et al. | 99—136 |
| 2,502,397 | 3/50 | Werbin | 99—136 |
| 2,555,849 | 6/51 | Glabe | 99—136 |
| 2,604,406 | 7/52 | Blihovde | 99—136 |
| 2,856,289 | 10/58 | Weinstein | 99—136 |

OTHER REFERENCES

"Substitutes in Ice Cream," August 1, 1941, page 182.

A. LOUIS MONACELL, *Primary Examiner.*

BEATRICE H. STRIZAK, *Examiner.*